(12) United States Patent
Tharaldson et al.

(10) Patent No.: US 12,441,437 B2
(45) Date of Patent: Oct. 14, 2025

(54) THROTTLE ACTUATOR POSITION VERIFICATION

(71) Applicant: Polaris Industries Inc., Medina, MN (US)

(72) Inventors: Joseph D. Tharaldson, Taylors Falls, MN (US); Trevor F. Rhodes, Badger, MN (US); Peter Kern, Greenbush, MN (US); Joshua J. Mickelson, Medina, MN (US); Tyler Bentow, Roseau, MN (US); Michael A. Hedlund, Roseau, MN (US); Craig McConnell, Prineville, OR (US); Luis Felipe Sanchez, Portland, OR (US); Scott Richard Volk, Tualatin, OR (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/517,073

(22) Filed: Nov. 22, 2023

(65) Prior Publication Data

US 2024/0182134 A1 Jun. 6, 2024

Related U.S. Application Data

(60) Provisional application No. 63/429,915, filed on Dec. 2, 2022.

(51) Int. Cl.
*B62M 27/02* (2006.01)
*B62K 23/06* (2006.01)

(52) U.S. Cl.
CPC ............. *B62M 27/02* (2013.01); *B62K 23/06* (2013.01)

(58) Field of Classification Search
None
See application file for complete search history.

(56) References Cited

U.S. PATENT DOCUMENTS

| | | | | |
|---|---|---|---|---|
| 5,829,312 A | * | 11/1998 | Hering et al. | F02D 11/02 74/489 |
| 7,195,527 B2 | * | 3/2007 | Tani | B63H 21/22 440/87 |
| 2004/0147179 A1 | * | 7/2004 | Mizuno | B63H 11/113 440/1 |

* cited by examiner

*Primary Examiner* — Vicky A Johnson
(74) *Attorney, Agent, or Firm* — Merchant & Gould P.C.

(57) ABSTRACT

A throttle actuator includes a base, a carrier and a circuit board coupled between the base and the carrier. The circuit board has a first force sensor and a second force sensor. A spring plate is disposed between the carrier and the circuit board. The spring plate is adjacent to and extends between the first force sensor and the second force sensor. A cover is coupled to the base enclosing the carrier, the spring plate and the circuit board between the cover and the base.

23 Claims, 7 Drawing Sheets

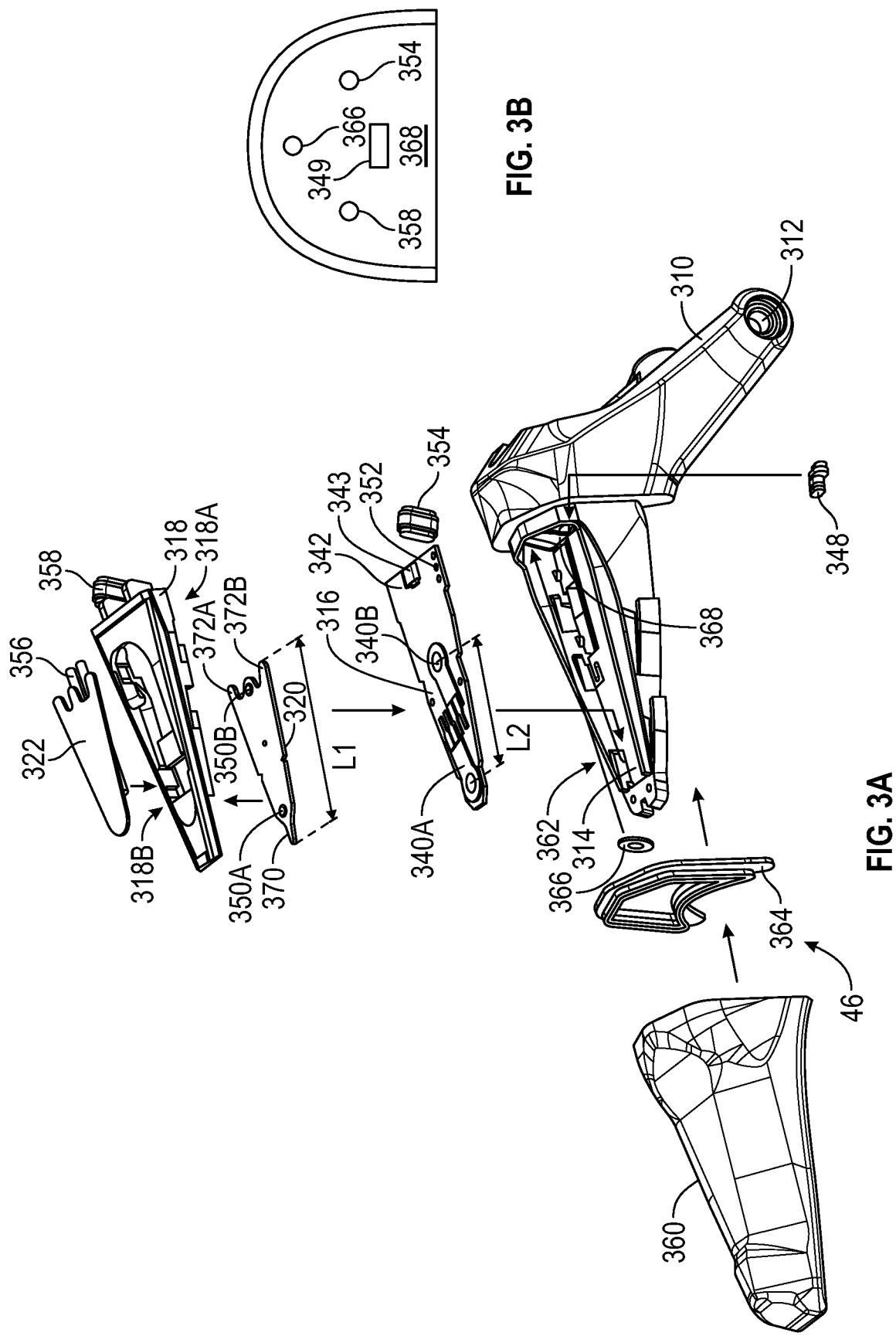

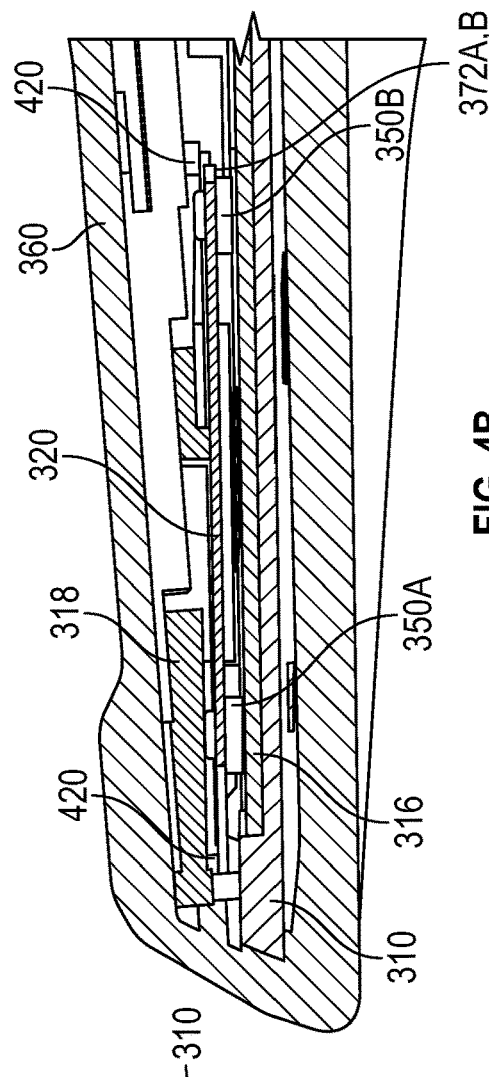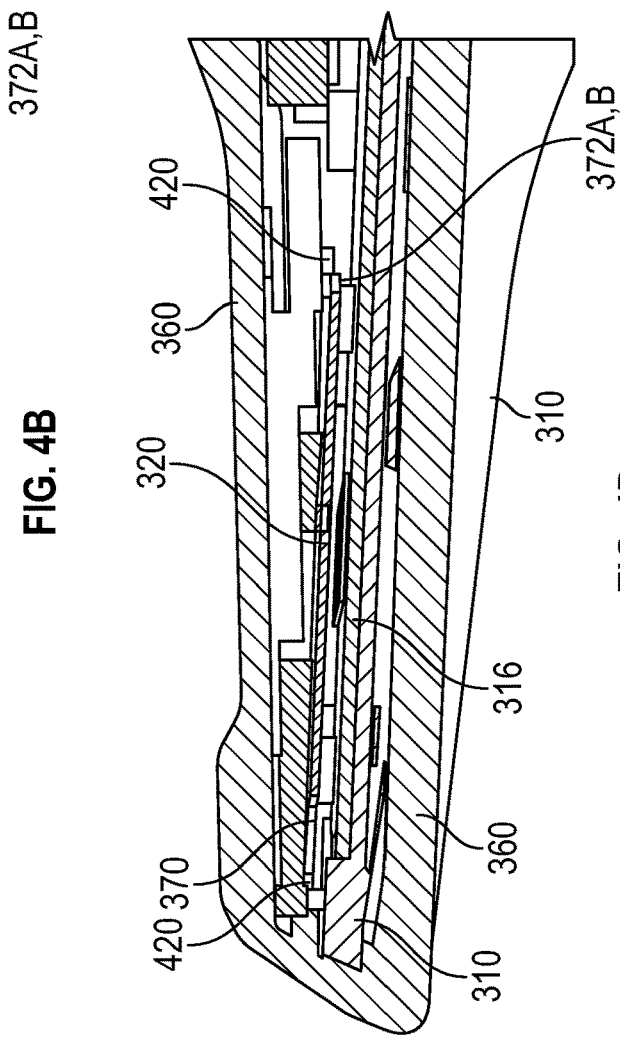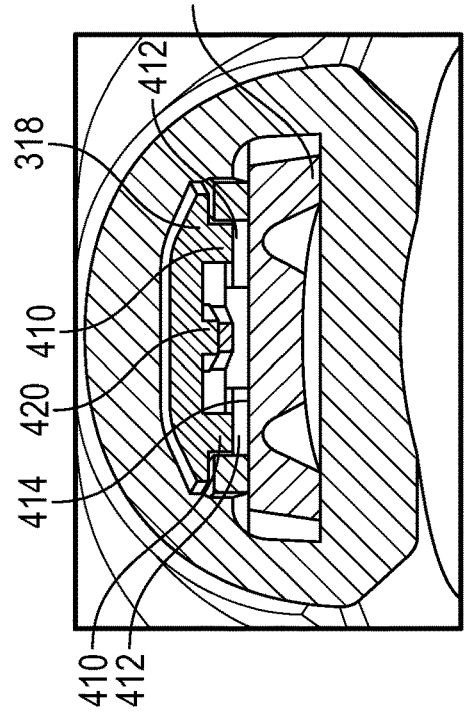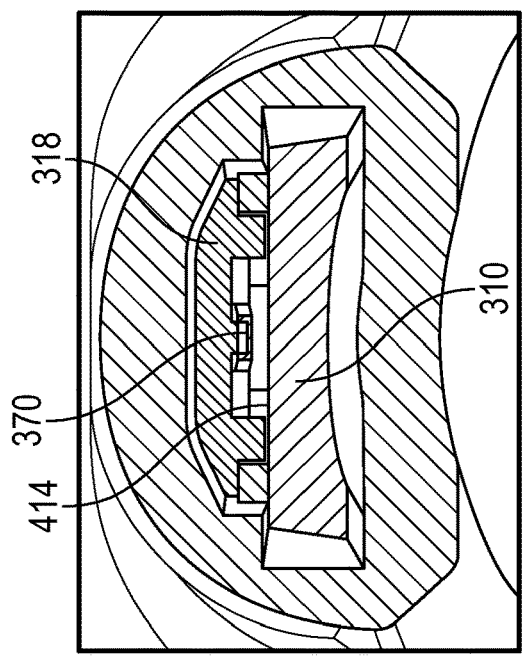

THROTTLE ACTUATOR POSITION VERIFICATION

CROSS-REFERENCE TO RELATED APPLICATION

This application claims the benefit of U.S. Provisional Application No. 63/429,915, filed on Dec. 2, 2022. The entire disclosure of the above application is incorporated herein by reference.

FIELD

The present disclosure relates to vehicle operator safety and particularly to a throttle verification and operation system.

BACKGROUND

This section provides background information related to the present disclosure which is not necessarily prior art.

Vehicles may be used in various applications and conditions. One example of a vehicle is a snowmobile that is generally exposed to harsh and varying environments. The environments may interact with control systems of the vehicles in unintended manners. The unintended action caused by the environment may include sticking of various components and assemblies. Other types of vehicles that operate under harsh conditions include ATVs and watercraft.

Snowmobiles may generally be provided including a frame, suspension, running boards, and other assemblies including an engine assembly to power an endless belt or track to drive the snowmobile. ATVs have wheels instead of a track. Watercrafts have propellers or jet pumps instead of a track or wheels. All the above-mentioned vehicles have an engine and a throttle system that is operated by a throttle lever positioned remote from the engine. The throttle lever may generally be manually operated by an operator of the vehicle, typically by hand. The operator may generally depress or move the throttle lever to, in turn, operate a throttle at the engine with an intention to power the vehicle in the desired direction of travel.

SUMMARY

This section provides a general summary of the disclosure and is not a comprehensive disclosure of its full scope or all of its features.

In various examples, a throttle articulation verification system may be equipped onto a vehicle. The vehicle may include appropriate vehicles such as a snowmobile, ATV, or other appropriate off-road or on-road vehicle. The verification system may be integrated into or attached to a throttle lever or actuator to assist in providing a verification signal to an engine control unit (ECU). The signal from the verification system (VS) may be in addition to and/or complement (e.g., to be compared with) a signal from a throttle position sensor (TPS). The VS may also include a sensor positioned with or on a throttle cable or throttle hand, including a hand control body.

In various examples, the VS may include one or more sensors positioned on or integrated with the throttle lever to send a signal with or subsequent to the actuation of the throttle lever. The actuation may include moving, engaging, or pressing the throttle lever by an operator. The signal sent by the VS may be compared to a signal from the TPS to confirm location or intended movement of the throttle lever relative to the TPS.

In various examples, an operator sensor may also be provided. The operator sensor operates to sense that an operator is presently on or in the vehicle. For example, a proximity or force sensor may be present to determine that the operator is in an appropriate operating position or proximity. In one aspect of the disclosure, a throttle actuator includes a base, a carrier and a circuit board coupled between the base and the carrier. The circuit board has first force sensor and a second force sensor. A spring plate is disposed between the carrier and the circuit board. The spring plate is adjacent to and extends between the first force sensor and the second force sensor. A cover is coupled to the base enclosing the carrier, the spring plate and the circuit board between the cover and the base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIG. 3A is a detailed schematic view of a throttle actuator and a verification sensor, according to various examples;

FIG. 3B is a detailed view of a base wall of the actuator of FIG. 3A;

FIG. 4A is a lateral cross-sectional view of an undeflected sensor system.

FIG. 4B is a longitudinal cross-sectional view of the undeflected sensor system of FIG. 4A.

FIG. 4C is a cross-sectional view of the sensor in a deflected position.

FIG. 4D is a longitudinal cross-section of the sensor system of FIG. 4C.

Corresponding reference numerals indicate corresponding parts throughout the several views of the drawings.

DETAILED DESCRIPTION

Example examples will now be described more fully with reference to the accompanying drawings. Although the following description includes several examples of a snowmobile application, it is understood that the features herein may be applied to any appropriate vehicle, such as motorcycles, all-terrain vehicles, etc. Moreover, while the description herein includes specific examples of a throttle lever connected to a handlebar, the throttle lever may be connected or actuated with other portions rather than a hand or digits thereof.

Figure 1A:
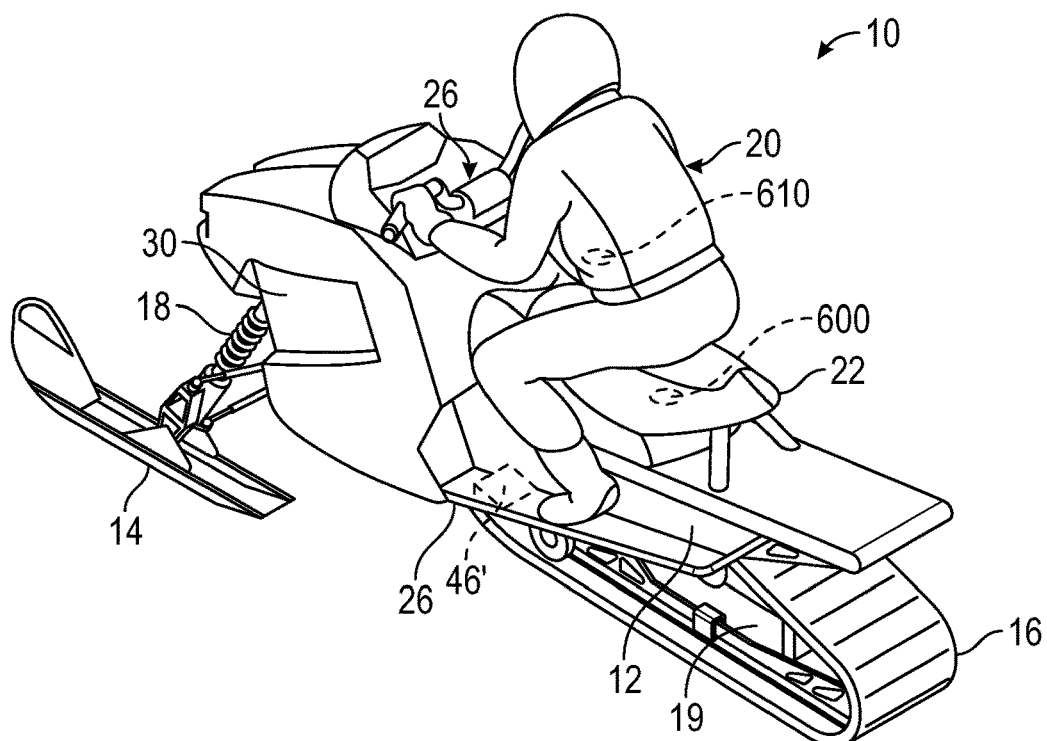
FIG. 1A is an environmental view of a vehicle, according to various examples.
Figure 1B:
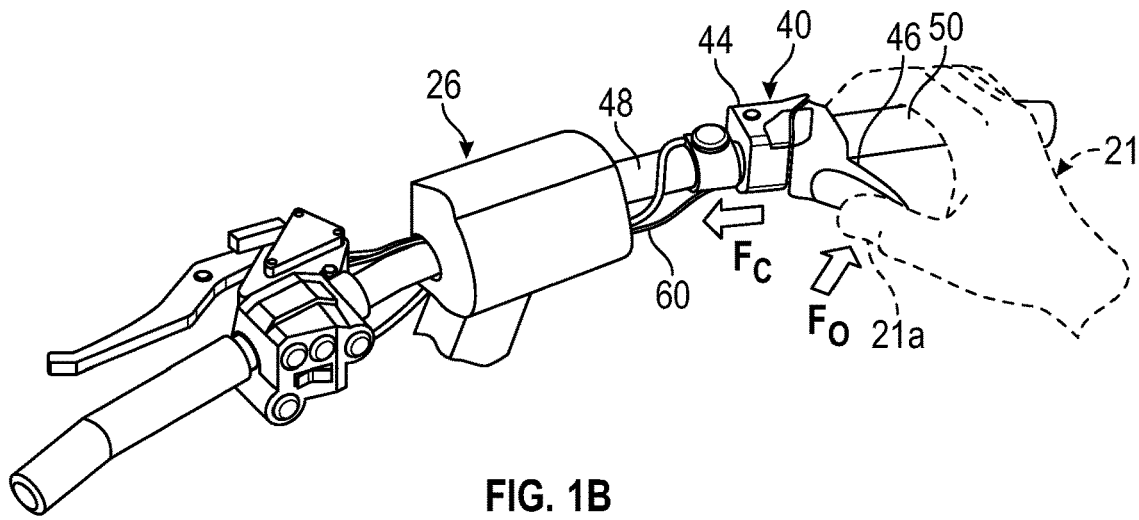
FIG. 1B is a detailed view of a throttle actuator, according to various examples.

With reference to FIG. 1A and FIG. 1B, a vehicle such as a snowmobile 10, according to various examples, is exemplarily illustrated. Other types of vehicles such as watercraft, utility vehicle and the like may benefit from the present disclosure. Snowmobile 10 may include various assemblies and subassemblies including a frame 12 that is supported by one or more forward or front skis 14 and an endless track assembly 16. Each of the front skis 14 may be supported by a suspension assembly 18 and the endless track assembly 16 may be supported by a rear suspension assembly 19. An rider, user, or operator 20 may ride or be supported on a seat assembly 22 mounted on the frame assembly 12. The operator 20 may also engage one or more running boards 24 with feet of the operator 20. Further, a steering assembly 26 may be engaged by hands 21 and/or digits 21a of the operator 20, as discussed further herein. In addition, the frame assembly 12 may be encapsulated or covered, at least in part, by various body coverings, including a front body cowl or cover 30.

Figure 6A:
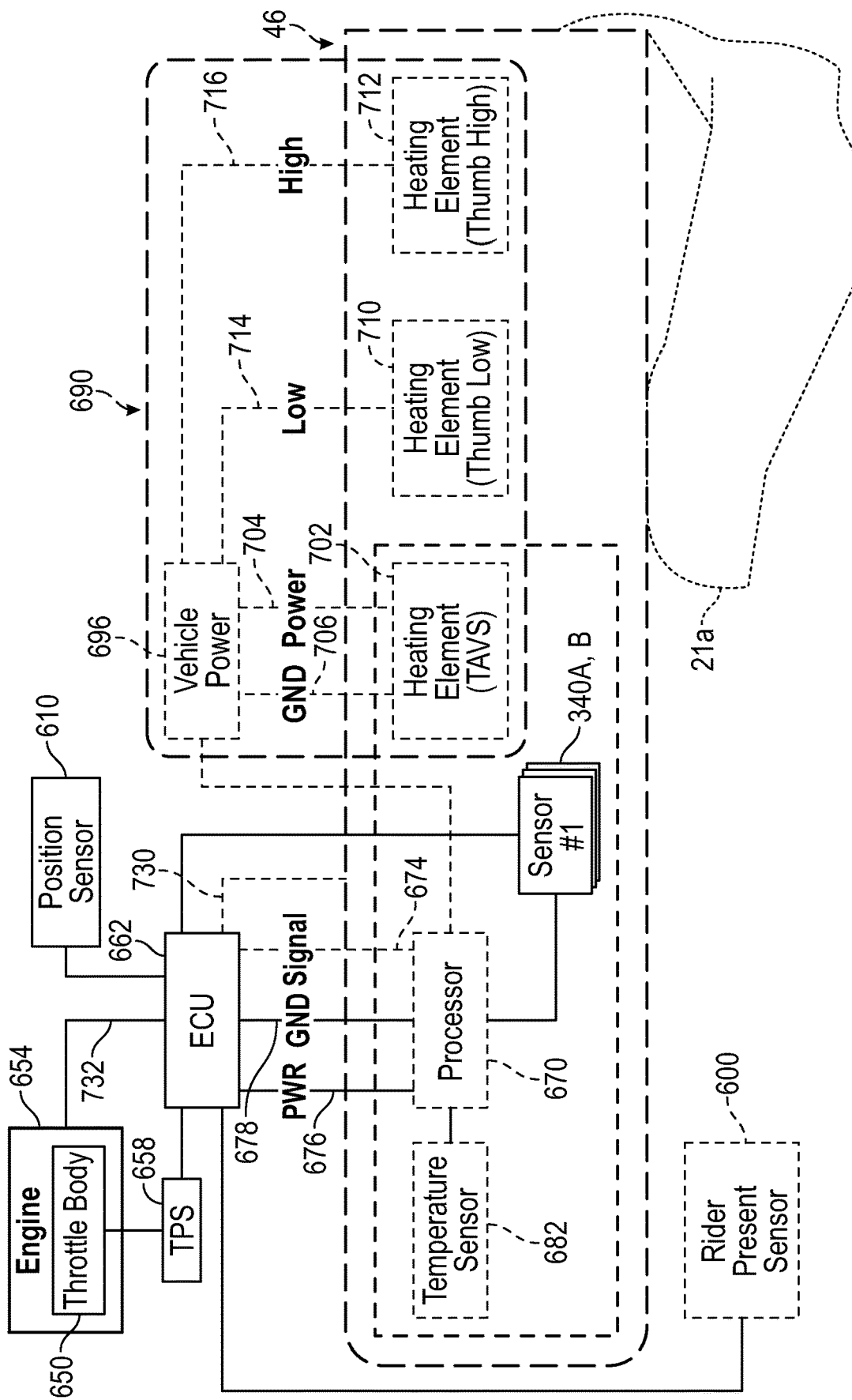
FIG. 6A is a schematic block diagram of components of the vehicle of FIG. 1A and verification system.
Figure 6B:
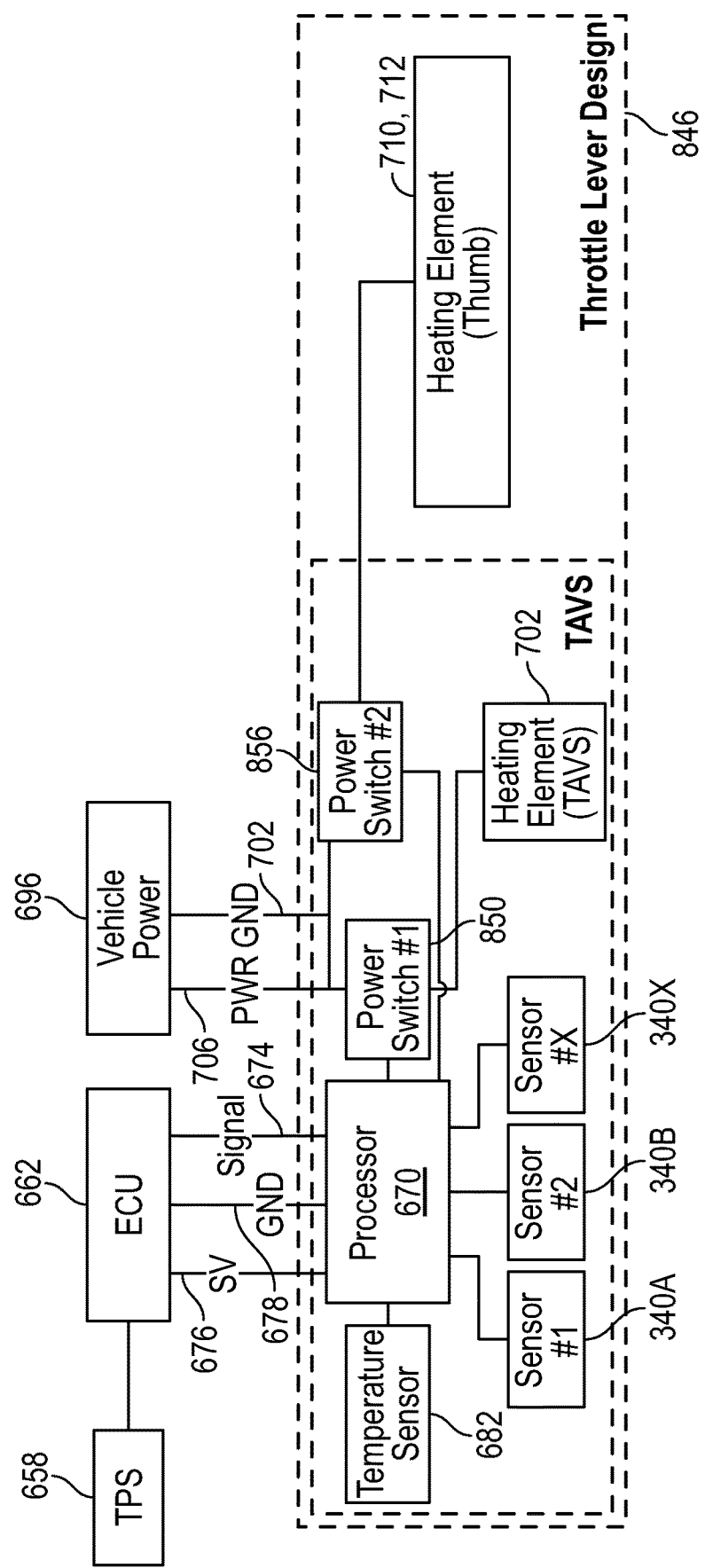
FIG. 6B is a schematic block diagram of components of the vehicle of FIG. 1A and verification system, according to various examples.
Figure 6C:
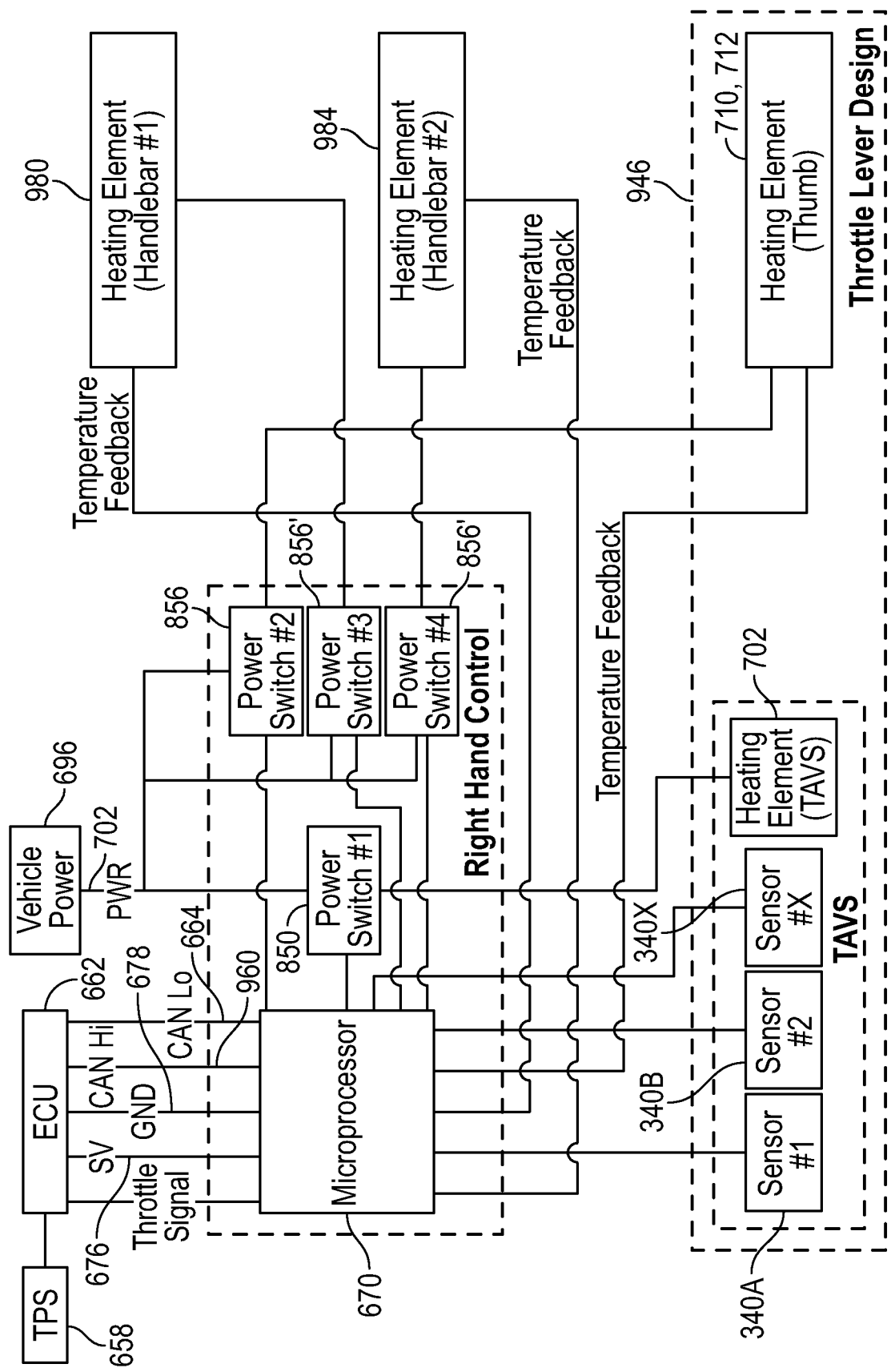
FIG. 6C is a schematic block diagram of components of the vehicle of FIG. 1A and verification system, according to various examples.

Within the frame assembly 12 and cover 30 may be a powertrain including at least an engine 654 (FIG. 6A, 6B, or 6C). The powertrain may be operated by the operator 20 to power the endless track 16, and in turn, move the snowmobile 10 and the operator 20, when riding on the snowmobile 10. The operator 20 may operate the snowmobile 10 by engaging and operating a throttle hand control 40. The throttle hand control 40 may have a linkage to at least a portion of a throttle body 650 (FIG. 6A, 6B, or 6C) in the engine 654. The linkage may be a direct physical connection, such as a cable, and/or may include an electronic connection, such as with a "drive-by-wire" system.

With continued reference to FIG. 1A and additional reference to FIG. 1B, the throttle hand control 40 may also be referred to as a throttle operator and include a throttle hand control body 44 and an actuator or throttle lever. The throttle lever 46 may also be referred to as a flipper or a pedal, such as a foot pedal 46', or other appropriate throttle actuator.

The throttle lever 46 may be moveable relative to the hand control body 44, such as by pivoting. The throttle hand control 40 may be mounted (e.g. fixed) to a handlebar or grip bar 48. The handle bar 48 may be moved by the operator 20 to steer the snowmobile 10. The grip bar 48 may include an extension or a hand grip portion 50 extending past the throttle hand control 44.

As is generally understood in the art, the operator 20 may engage at least to the throttle lever 46 with a portion of the operator's hand 21, including the digit (e.g. thumb) 21a to move the throttle lever 46 relative to the hand control body 44 and/or the handgrip portion 50. Movement of the throttle lever 46 generally causes movement of a throttle portion (e.g. a throttle valve) in a throttle body at the engine to either accelerate or decelerate the engine speed. A throttle position sensor (TPS) 658 (FIG. 6A), may sense the throttle position and send a TPS signal to an engine control module, including an engine control unit (ECU) 662 (FIG. 6A). A verification signal may be sent or received from a throttle activation verification system (TAVS) that includes one or more verification system (VS) sensors at or near the throttle actuator 46 to sense force from the operator 20 on the throttle actuator 46, as discussed herein, is also sent to the ECU 662 to evaluate and verify an intention to open a throttle or increase engine RPMs. Alternatively or in addition to the TAVS may be a rider present signal from a tether or rider present system, as also discussed herein.

Figure 2:
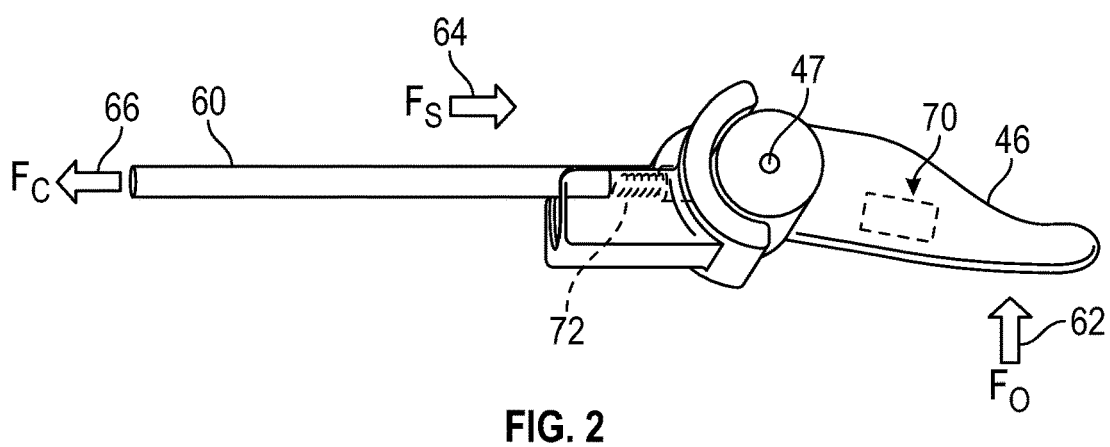
FIG. 2 is a detailed view of a throttle actuator and verification system, according to various examples.

With reference to FIG. 2, a throttle lever 46 is illustrated according to various examples. The throttle lever 46 may be connected to a throttle linkage, the throttle linkage may include a throttle cable 60, as illustrated in FIG. 2 that is connected to the throttle valve at the engine. The throttle cable 60 provides a force on the throttle lever 46 that must be overcome to operate the throttle in the engine as the throttle lever is pushed toward the handgrip portion 50 by the operator 20. An operator force ($F_o$) is applied generally in the direction of arrow 62. The $F_o$ applied toward the handgrip portion 50 may overcome a throttle force Fc (e.g., a throttle cable) that is generally in the direction of arrow 66. The VS may include a VS sensor system or assembly, such as a sensor assembly 70 to confirm or verify the position of the throttle lever 46. The VS, as discussed herein, may provide a verification signal to an engine control unit (ECU) 662 (FIG. 6A, 6B, or 6C) regarding an intended or actual position of the throttle lever.

The sensor assembly 70 may include a spring 72. The spring 72 biases the throttle lever 46 into the position illustrated in FIG. 2. The operator force in the direction of arrow 62 must first overcome a spring force ($F_s$) of the spring 72 generally in the direction of arrow 64 that is generally in a direction opposite of the throttle force in the direction of arrow 66. Although the spring 72 is located adjacent to the throttle lever 46 in this example, the spring 72 may be move closer to the engine along the throttle cable 60.

When the user or operator 20 overcomes the spring force $F_s$ of the sensor assembly, a signal is sent to the ECU to indicate that the operator 20 is applying a force to the throttle lever 46 and intends to move or power the snowmobile 10. Therefore, the ECU may operate and control the motor as generally programmed under normal operating conditions (e.g., increased throttle requires increased fuel and/or increased engine rotations per minute (RPM)). The throttle force Fc in the direction of arrow 66, however, may become zero or negligible relative to the throttle lever 46 if the cable 60 becomes stuck in any position. If the cable 60 does not move when the throttle lever 46 is released, the sensor assembly 70 generates a signal corresponding to no or very little force thereon. The sensor 70 sends a signal to the ECU indicating that the throttle lever 46 has been disengaged.

If the cable 60 is stuck, however, the throttle cable 60 does not move, thus the throttle may remain open. The ECU, upon receiving the signal from the sensor assembly 70, may change the operation of the engine to a selected mode, such as a limp mode, when the signal is received. The limp mode may be any selected operational mode such as controlled by the ECU or any appropriate control module, such as to disable a spark to the engine, generate a diagnostic trouble code, cutoff fuel to the engine, reduce the throttle valve opening, reduce the exhaust valve opening, reduce transmission gearing, or other appropriate control of the engine to eliminate or reduce power by the engine to slow the snowmobile 10, and in any combination of previous mentioned methods.

It is understood, as discussed herein, that the throttle 650 in the engine 654 need not be operated directly by a physical connection to the throttle 650, such as from the throttle cable 60 extending from the throttle lever 46. In various examples, an electronic throttle control (ETC) (also referred to as drive-by-wire) is provided or operated. When an ETC is operated, a lever position sensor at or near the throttle lever 46 may sense a position of the throttle lever 46 and send the signal to the throttle directly or through the ECU. The throttle may then be moved (for example by an electric motor) to the selected position based on the sensed position of the throttle lever 46. Nevertheless, a VS sensor may be provided to confirm and/or verify the position of the throttle lever.

Referring now to FIGS. 3A and 3B, an exploded view of the assembly of the throttle lever 46 is illustrated. The throttle lever 46 has a base 310 that is rotatably coupled to the handle or other parts of the vehicle at the openings 312 that receive a pin (not shown) about which the base 310 rotates therearound. As mentioned above, the base 310 may be biased into an off position by a spring. The base 310 has a receptacle 314 for receiving a circuit board 316. The receptacle 314 is sized to secure the circuit board 316 therein by an interference fit. A carrier 318 is disposed within the base 310. The carrier 318 has a lower surface 318A that receives a spring plate 320. The spring plate 320 is received within the lower surface 318A as will be described in further detail below.

The carrier 318 has an upper surface 318B that may house a heater 322.

The circuit board 316 has a plurality of pressure or force sensors 340A, 340B. Only two force sensors 340A, 340B are illustrated in this example. The force sensors 340A, 340B may be an appropriate sensor such as a pressure sensor, strain gauges, piezoelectric, force sensing resistor (FSR), Hall Effect sensors (and an appropriate magnetic material used therewith), a load cell or another appropriate sensor. In various examples, as discussed herein, the force sensor 340A, 340B (or any appropriate identified sensor) may be a pressure transducer, a touch indication sensor including a capacitive (capacitance) touch sensor, resistance, or piezo touch switch may also be provided to determine contact by the operator 20 with the throttle lever 46.

The circuit board 316 may also contain a calibration circuit 342 that may be coupled to external equipment using an electrical connector or port 343. The calibration circuit 342 may include a positive set point and a negative set point for controlling the set points of the operation of the force sensors. A thermal drift compensation circuit may also be provided therein as described below.

The spring plate 320 has a length L1 greater than the distance between the force sensors 340A, 340B as L2. As will be shown in more detail below, the spring plate 320 may include pressure pads 350A, 350B that are positioned to correspond to the positions of the force sensors 340A, 340B. Pressure pads 350A, 350B may be formed of compressible material such as rubber or foam.

The carrier 318 and the spring plate 320 may be formed of flexible material. The spring plate 320 distributes the force provided by the carrier 318 over its length to distribute the force to the force sensors 340A, 340B.

The circuit board 316 also has at least one wire 352 extending therefrom. The wire 352 may communicate the sensor signals or processed force sensor signals to a central controller within the vehicle. The wire 352 may be received within a wire seal 354.

The heater 322 may be one of a number of different types of heaters. Examples of suitable heaters include a positive temperature coefficient (PTC) heater or another resistive type of heater. The heater 322 therefore has a heater wire 356 coupled thereto. The heater wire 356 may be coupled to a power source within the vehicle. A wire seal 358 may be used to seal the wire for the heater 322.

The heater 322 may be received at least partially on the second surface 318B of the carrier. The heater 322 may also be flexible to allow it to move with the flexible carrier 318.

The circuit board 316, the spring plate 320, the carrier 318 and the heater 322 may all be enclosed between a cover 360 and the base 310. The cover 360, in this example, is shaped to be ergonomically designed to receive the thumb or other digit of the operator of the vehicle. The cover 360 and the base 310 form a cavity 362 therebetween.

The cover 360 and the base 310 have a flexible seal 364 that seals the cover 360 to the base 310 along a lateral edge of the cover 360.

A hydrophobic vent 366 is disposed in a lateral side of the base 368 of the base 310. The hydrophobic vent 366 may be formed of Gore-Tex® or other materials. The hydrophobic vent 366 prevents water from entering the cavity 362 while allowing air to vent therethrough during operation.

A port plug may 348 close or seal a port or opening 349 in the base 310 used for electrically connecting to the calibration circuit 342 and setting set points thereon.

The cover 360 is also formed of a flexible material. That is, when the operator places force on the cover, the cover changes the position and flexes the flexible carrier 318 and thus the spring plate 320 distributes the force over the force sensors 340A, 340B and 340X (shown below), where 340X represents more than two force sensors.

Referring back to the spring plate 320, a first tab 370 is disposed at one end thereof. A pair of second tabs 372A, 372B are disposed at the other end of the tab. The spring plate 320A is generally rectangular with the tab 370 disposed at the apex of the triangle, while tabs 372A, 372B are disposed at the lower angles thereof.

Referring now to FIGS. 4A-4D, lateral cross-sectional views through the carrier 318, the spring plate 320, the circuit board 316 and the base 310 are illustrated.

The base 310 has the circuit board 316 recessed therein. As illustrated, the pads 350A, 350B extend through the spring plate. The amount of force that the carrier 318 places on the force sensors 340A, 340B of the circuit board 316 is nominal until force is applied to the carrier 318 by applying force to the cover 360 which gets applied to the carrier 318 and ultimately to the force sensors of the circuit board 316.

A plurality of movement stops 410 extend from the carrier 318 toward the base 310. Movement stops 410 may be located in various positions on the carrier 318. The movement stops 410 in an at rest position have a gap 412 between the movement stop 410 and base surface 414. A maximum deflection of the movement stops 410 toward the base surface 414 is illustrated in FIG. 4C. A maximum gap 412 is illustrated in FIG. 4A. A plurality of deflectors 420 also extend from the carrier 318 toward the base 310. The deflectors 420 align with the tabs 370, 372A, 372B. That is, one spring deflector 420 may correspond to each of the respective tabs 370, 372A, 372B. The deflectors 420 extend a distance from the carrier less than the distance from the movement stops 410. This allows the deflector 420 to move the spring plate only a predetermined distance toward the force sensors 340A, 340B.

Figure 5A:
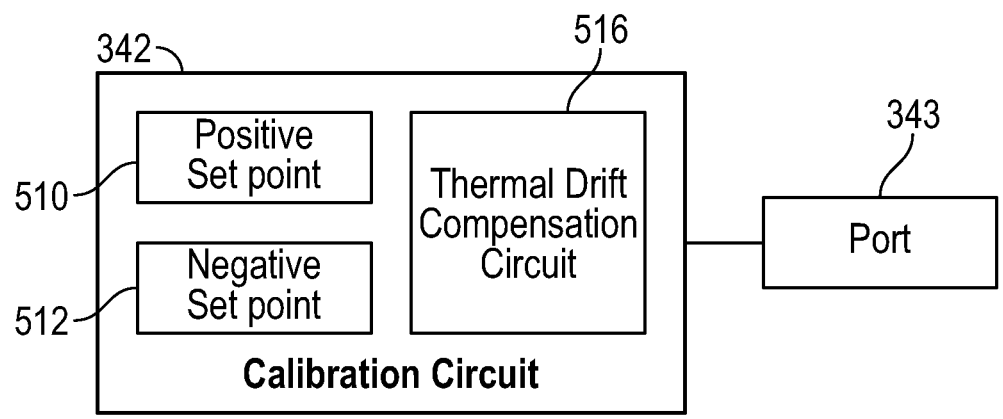
FIG. 5A is a block diagrammatic view of the compensation circuit of FIG. 3A.

Referring now to FIG. 5A, the calibration circuit 342 together with the port 343 is illustrated in further detail. The calibration circuit 342 may have a positive set point 510, a negative set point 512 and a thermal drift compensation circuit 514. The calibration circuit 342 may be located on the circuit board 316 as described above. The positive set point 510 and the negative set point 512 are the trigger points to indicate the throttle lever 46 is being pushed or left off. The positive set point 510 and the negative set point 512 may be stored during a calibration process. The calibration process may apply a certain amount of force to the force sensors. For example, 120% of the expected max force may be applied several times for several seconds, such as 10 seconds each. The circuit sensitivity may be adjusted so that the output is 90% of the circuit's maximum output and then the force is removed.

The thermal drift compensation circuit 516 allows the sensors 340A, 340B to have a linearized output even when the temperature is changing.

Figure 5B:
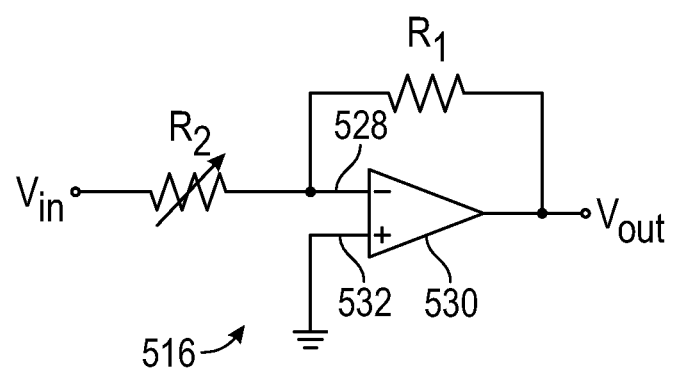
FIG. 5B is a detailed circuit of the temperature compensation circuit of FIG. 5A.

Referring now to FIG. 5B, an example of the thermal drift compensation circuit 516 is illustrated. In this example, a thermistor $R_s$ is used in the circuit for thermal compensation. The input voltage $V_{in}$ is provided to the inverting input 528 of the operational amplifier 530 through the thermistor $R_s$. A feedback resistor $R_f$ may be chosen to provide the desired linear output. The inverting input is 528. The noninverting input 532 to the operational amplifier 530 is coupled to ground. Thus, by providing the thermistor $R_s$ to the input of the operational amplifier 530, the output of the operational amplifier 530 is linear no matter the temperature.

Returning reference to FIG. 1A, a position or proximity sensor assembly may be provided between the operator 20 and the snowmobile 10. In addition to a sensor configured and operable to verify the application of the operator force to the throttle lever 46, a verification system may be provided to verify the position of the operator 20 relative to the snowmobile 10. For example, the operator position verification system may include a sensor, such as a proximity sensor of the operator 20 relative to the snowmobile 10. In various examples, a first sensing portion such as a rider present sensor 600 may be positioned or formed with the snowmobile 10, such as within the seat 22. A second sensor portion 610 may be integrated or attached to a portion of the operator 20, such as a sensor portion 610 positioned in a pocket of a jacket of the operator 20. The second sensor portion 610 may, for example, be a tether.

At a first selected or predetermined distance between the rider present sensor 600 on the snowmobile 10 and the second sensor portion 610 with the operator 20, the engine of the snowmobile 10 may operate in a normal mode. At a second distance, such as a distance greater than the first predetermined distance, the rider present sensor 600 may send an error or non-verification signal to the ECU to change the operational mode of the engine. In various examples, a weight or force sensor may be incorporated into the seat 22 to sense a weight of the operator 20 on the seat 22 to send a proper rider proximity signal. Accordingly, a proximity of the operator 20 relative to the snowmobile 10 may also be required for normal operation of the snowmobile 10.

As discussed above, if the operator 20 is not near (e.g., positioned on the seat 22 of the snowmobile 10) the snowmobile 10, a non-proximity signal may be sent, and then the engine may be placed into a limp or stop mode. In various examples, the operator 20, including the second sensor portion 610, is required to be near or in contact with the snowmobile 10 for normal operation of the engine. In this manner, the position of the operator 20 relative to the snowmobile 10 is also be used as a verification system, and/or to supplement other verification systems (e.g., the VS signal sent form the sensor at the throttle lever as discussed above), to provide a verification signal to the ECU for operation of the engine. Therefore, the ECU may compare the signal from the operator position verification system to the throttle position sensed by the TPS (throttle position sensor signal) to confirm that the throttle should be an open or high throttle position. If the operator 20 is not in an appropriate location relative to the snowmobile 10, the ECU may change the operational mode of the engine based upon the lack of a verification signal.

Turning to FIG. 6A, a schematic illustration of the throttle lever 46 including at least one of the verification or operator force sensors is shown. As discussed above, the operator force sensors are part of the verification system. The digit 21a of the operator 20 may contact the throttle lever 46 to actuate (e.g., move) the throttle lever. Movement of the throttle lever 46 causes a throttle body 650 in an engine 654 to increase throttle. As is generally understood in the art, the throttle body 650 may include a valve, such as the butterfly valve. As the butterfly valve opens a greater amount of an air/fuel mixture may enter the engine 654 to allow a greater combustion of fuel in the engine 654.

The position of the valve, such as the butterfly valve, in the throttle body 650 may be sensed by a TPS 658. The TPS 658 sends a signal to the ECU 662. Under normal or a first operating condition, the ECU 662 controls various other inputs to or conditions of the engine 654 such as fuel, spark, and the like. Under normal operating conditions, the more open the throttle valve in the throttle body 650, the higher rotations per minute (RPM) the engine will operate and the greater speed of the snowmobile 10. Under various other conditions, however, the ECU 662 may be programmed to operate the engine 654 in a non-normal, such as a governed or controlled, manner. For example, the ECU 662 may cut fuel, stop spark, or other operational parameters of the engine 654 may be limited if the ECU 662 determines that the engine 654 should not operate in a normal manner.

The throttle lever 46 includes one or more sensors, such as the sensor assembly 70. As discussed above the sensor assembly 70 may be incorporated into a verification system that is on or incorporated with the throttle lever 46 or relative to the throttle lever 46. It is understood, however, that more than one sensor may be included. The sensor assembly 70 transmits a signal to the ECU 662 regarding the sensed feature, such as the operator force on the throttle lever 46.

In various examples, the verification system includes a processor 670 as a part of the verification system, such as co-located with the sensor assembly 70 or any appropriate sensor, at the throttle lever 46 or near the throttle lever 46. The processor 670 may be any appropriate processor such as a micro-processor including the PIC18LF26K80-I/SS or PIC18LF26k80-I/MM, both sold by Microchip Technology, Inc. having a place of business at Chandler, AZ. The processor 670 receives a signal from the sensor assembly 70 and allows for local processing of the VS signal from the sensor assembly 70. The processor 670 can send a predetermined digital signal to the ECU 662 along a signal line 674. The signal from the processor 670 to the ECU 662 need not be further processed at the ECU 662 other than to determine whether the signal sent from the processor 670 is the signal to allow normal operation of engine 654. The processor 670 may also be provided with power through a power connection 876 and may further include a ground connection 678. Various other sensors may also be provided at the throttle lever 46, such as a temperature sensor 682 to determine an environmental temperature at or near the processor 670.

The sensor assembly 70 may also provide a signal directly to the ECU 662. Thus, the processor 670 is not required. Further, the VS signal to the ECU 662 may be any appropriate signal, such as an analog or a digital signal. If an analog signal is sent directly to the ECU 662, it may be received at an analog input and be converted to a digital signal with an appropriate A/D converter. Regardless of the type of signal, as discussed herein, the ECU 662 may act as a determination system, such as an AND gate, to determine engine operation based on the single from the sensor assembly 70 to the signal from the TPS 658.

In various examples, the sensor assembly 70 and/or the processor 670 may operate optimally in a selected environmental condition, which may be outside the range of environmental conditions experienced by the snowmobile 10 or other vehicle system. Accordingly, a temperature sensor 682 senses a temperature at or near the processor 670 and transmit the temperature to the processor 670. The processor 670 can send a signal to a heating system 690 along a signal line 694. The signal may go first to a vehicle power 696 that powers a verification system heating element 702. The verification system heating element 702 may be provided with a power line 704 from the vehicle power and a ground 706. The vehicle power 696 may also power a heating element for the throttle lever 46, such as to provide heat to the digit 21*a*. For example, a low power heating element 710 and a high-power heating element 712 may be provided. The respective heating elements may have a low power line 714 and a high-power line 716 to power the respective heating elements. In this way, the high and low power heating elements 710, 712 provide a selected temperature for the digit 21*a* and the verification system heating element 702 may provide heat for an optimal temperature operational range for the processor 670 and/or the sensor assembly 70. Generally, the high-power heating element 712 may be powered to generate a local temperature of about 90° C. to about 120° C., including about 100° C. to about 110° C., and further about 105° C. The low power heating element may be powered to generate a local temperature of about 50° C. to about 60° C.

As also discussed above, the verification system may have an optional rider present (e.g., proximity) sensor 600. The rider present sensor 600 may also transmit a signal to the ECU 662. The ECU 662 may then generate a signal for operation of the engine 654 that is based on the signal from the rider present sensor 600 and/or the operator force sensor and the TPS signal from the TPS 658.

In addition, the throttle lever 46 may be connected directly (e.g., with a cable) to the throttle body 650 and/or with the ETC, as discussed above. The connection for the ETC may be through a throttle communication line 730 to the ECU 662 and a communication line 732 to the engine 654 (including the throttle body 650). Thus, the throttle lever 46 may be operated to change the throttle and speed of the engine 654.

In various examples, a throttle actuator 846 may be provided, as illustrated in FIG. 6B. The throttle lever 846 is substantially similar to the throttle lever 46 illustrated in FIG. 6A, and the same reference numbers are used for the same components. The throttle lever 846 includes a first power switch 850 and a second power switch 856. The power switches 850 and 856 may be switched with the processor 670 to power on the respective heating elements, including the heating element 702 for the verification system and the heating elements 710, 712 for the thumb heater. This configuration may allow for efficient communication and control of the various heating elements, and reduce components. It is understood that any appropriate components may be provided to operate the selected heating elements. Moreover, more than one sensor may be provided in the sensor assembly 70 is provided, including sensors 340A, 340B. The sensors 340A, 340B may be redundant or different types of sensors. More sensors 340X may be provided for redundancy. In operation, however, the multiple sensors provide the VS signal to the ECU 662, as discussed above.

In various examples, a throttle actuator 946 may be provided, as illustrated in FIG. 6C. The throttle lever 946 is similar to the throttle lever 46 illustrated in FIG. 6A, and the same reference numbers are used for the same components. The throttle lever 946 may include more than one sensor assembly 70, including sensors 340A, 340B. The sensors 340A, 340B, 340X may be redundant or different types of sensors. In operation, however, the multiple sensors provide the VS signal to the ECU 662, as discussed above.

One or more of the sensors 340A-340X sends the appropriate signal to the processor 670, including the VS signal if proper, as discussed above. The processor 670 communicates with the ECU 662 via a controller area network (CAN), including a CAN high 660 and a CAN low 664, communication link. Other appropriate communication links or connections may also be provided that are redundant or alternative to the CAN communication, including a direct link form the sensors 70*b*, 70'*b*, and 70"*b* or other appropriate serial communication. The ECU 662 operates the engine 654 (FIG. 6A) as discussed above based at least on the signal from the sensors 70*b*, 70'*b*, and 70"*b*.

The processor 670 is further configured, such as by executing instructions stored on a memory (e.g., a memory incorporated with the processor 670) to operate switches for the various heating elements. The first power switch 850 may be operated based on feedback from the heating element 702, which may include a temperature sensor, to power or not power the heating element 702. The second switch 856 may be operated based on feedback from the heating element 710, 712, which may include a temperature sensor, to power or not power the heating element 710, 712. A third switch 856' may be operated based on feedback from the heating element 680, which may include a temperature sensor, to power or not power the heating element 680. A fourth switch 856" may be operated based on feedback from the heating element 984, which may include a temperature sensor, to power or not power the heating element 984. The heating elements 980, 984 may be provided at selected locations, such as in the handgrip portion 50 to warm the hand 21 of the operator 20.

The engine 654 may, therefore, be operated based upon a selected logic including inputs from the various sensors. The various sensors may include one or more sensors in the throttle actuation verification system that sends the VS signal. The various sensors may also include one or more rider present (also referred to as tether system) sensors 600. A signal from one or both of these systems is sent to the ECU 662. The ECU 662 also receives a TPS signal. The ECU 662, or other appropriate control module, according to the logic discussed herein, then controls and/or places the engine 654 in a selected mode based on a signal (e.g., high signal) from one or more of the TAVS and/or the rider present and a TPS signal. A temperature sensor associated with any one of the systems, including the TPS, the TAVS, or the rider present system, may also generate a signal that is used to adjust the output parameters of the respective systems. For example, a TAVS signal may be amplified by a selected amount if the sensed temperature is outside a selected range.

According to various examples, the control logic may include if a TPS signal from the TPS 658 is greater than an idle TPS percent (e.g. 7%) and a verification and/or rider (or operator) present signal is received (e.g. from the sensor assembly 70 and/or the ride or present sensor 600), a determination (e.g. by comparing and/or using an AND gate at least one of the sensor signals to the TPS signal at the ECU 662) that the rider is present and intending to increase and/or have a throttle greater than a selected amount (e.g. 7%) the throttle amount may be made and/or maintained and normal engine operation may be allowed by the ECU 662. It is understood that the ECU 662 may be programmed to require a signal (e.g., high signal) from both the VS and the rider present sensor, or only one. If the TPS signal is greater than the idle TPS percent and there is no verification signal from either or both of the sensor assembly 70 or the rider present sensor 600 (e.g. by comparing and/or using an AND gate at least one of the sensor signals to the TPS signal at the ECU 662), the ECU 662 may determine that the rider is not present and the engine 654 may be shut down, as discussed above by limiting or cutting fuel, spark, providing an engine error code, or other engine parameter. Further, if any of the signals from the verification system and/or the rider present system are invalid, the ECU 662 may determine to operate the engine in a limited engine performance, such as a limp mode allowing only a maximum engine speed or RPM.

As discussed above, various sensors may be provided in the throttle lever 46. The sensors may sense at least a contact or engagement of the operator with the throttle lever 46. The contact may further include an application of enough force to cause an initial flexion, deflection, strain, or the like of the operator 20 to the throttle lever 46. The initial application of force may be applied and be sensed by the selected sensor prior to overcoming the throttle cable force shown by the arrow 66 (understood to be overcome to increase the throttle whether or not a throttle cable is physically present). Therefore, the sensors at the throttle lever 46 may be used to verify that the sensed position of the throttle, such as with the TPS 658, is proper and valid. As discussed above, the logic instructions may then be followed to determine whether the engine 654 should be controlled in a normal or limited manner by the ECU 662. The sensors may further include a rider present sensor 600 that may be a further signal to the ECU 662 to which the logic is applied. It is further understood, the ECU 662 may be any appropriate control module and need not be the ECU 662. The control module receiving the VS signal may then operate the engine 654 and/or communicate with the ECU 662 to operate the engine 654.

The sensors at the throttle level 46 may be provided in an appropriate manner, such as connected to a surface thereof or incorporated—encapsulated into the throttle lever 46, as discussed above. Further, the sensors are generally encapsulated relative to the exterior environment to assist in resisting or ensuring no degradation of the sensor or operation of the sensor during the use of the snowmobile 10. Further, as discussed above, the environment near the sensor may be augmented with one or more heating elements to assist in ensuring proper application or sensing. The various sensors discussed above are also not exclusive to the examples in which they are illustrated, but may be placed in other examples alone or with other sensors. Regardless, the sensors may be verification sensors for verifying a contact or presence of the operator and to actuate the throttle lever.

Accordingly, the ECU 662 may include the logic scheme, as discussed above, to determine the proper mode of operation of the engine 654. The mode of operation of the engine 654 may be based upon both a signal from the TPS 658 and a signal from at least one of a rider present sensor 600 or a sensor at the throttle lever 46. Either or both of the signals may be applied by the ECU 662 to the TPS signal from the TPS 658 to determine proper operation or a selected operation of the engine 654. Accordingly, the ECU 662 may assist in ensuring a selected operation of the engine 654 based upon an actual intention and/or presence of the operator 20.

The signals from the sensors to the ECU may be any appropriate signal type. For example, a digital or an analogue signal may be sent to the ECU. Further, the signal may be a pulse width modulated signal or other appropriate signal type. Moreover, the signal may be transmitted via an appropriate communication link, such as a wireless or a wired communication link.

As discussed above, the TAVS may include one or more sensors, such as the sensor 70 or other sensor assembly as illustrated in various examples discussed above. It is understood that the various examples may include portions that can be combined together to form or form portions of the TAVS system, according to various examples, and may eliminate various portions of other examples. Accordingly, it is understood that the various examples are not mutually exclusive unless specifically stated so. Moreover, it is understood that various alternatives and/or additions may be made to the examples as discussed above.

Example examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that example examples may be embodied in many different forms and that neither should be construed to limit the scope of the disclosure. In some example examples, well-known processes, well-known device structures, and well-known technologies are not described in detail.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A throttle actuator comprising:
   a base;
   a carrier;
   a circuit board coupled between the base and the carrier, said circuit board comprising first force sensor and a second force sensor;
   a spring plate disposed between the carrier and the circuit board, said spring plate configured to distribute force applied to the carrier to the first force sensor and the second force sensor; and
   a cover coupled to the base enclosing the carrier, the spring plate and the circuit board between the cover and the base.

2. The throttle actuator as in claim 1 wherein the base comprises a recess for receiving the circuit board.

3. The throttle actuator as in claim 1 further comprising a heater coupled between the cover and the base.

4. The throttle actuator as in claim 3 wherein the heater is disposed adjacent to the carrier opposite the spring plate.

5. The throttle actuator as in claim 3 wherein the heater is flexible and comprises one of a resistive heater and a positive temperature coefficient heater.

6. The throttle actuator as in claim 1 wherein the carrier is flexible.

7. The throttle actuator as in claim 1 wherein the cover is flexible.

8. The throttle actuator as in claim 1 wherein the carrier comprises a movement stop.

9. The throttle actuator as in claim 8 wherein the spring plate comprises a first pad and a second pad coupled thereto, said first pad and said second pad formed of compressible material.

10. The throttle actuator as in claim 9 wherein said first pad disposed adjacent to the first force sensor and said second pad disposed adjacent to the second force sensor.

11. The throttle actuator as in claim 9 wherein the movement stop extends from the carrier toward the base, wherein the stop engages a base surface when the carrier is compressed.

12. The throttle actuator as in claim 11 wherein the movement stop extends a first distance from the carrier, wherein the carrier comprises a spring deflector extending a second distance from the carrier, said second distance less than the first distance.

13. The throttle actuator as in claim 12 wherein the spring deflector comprises a first spring deflector and a second spring deflector disposed adjacent to the first pad and the second pad, respectively.

14. The throttle actuator as in claim 1 wherein the cover and the base comprises a seal disposed therein.

15. The throttle actuator as in claim 1 wherein the base comprises a hydrophobic vent disposed therethrough, said vent coupled to a cavity between the cover and the base.

16. The throttle actuator as in claim 1 wherein the circuit board comprises a first wire, said first wire extending through the base through a first wire seal.

17. The throttle actuator as in claim 1 wherein heater comprises a second wire, said second wire extending through the base through a second wire seal.

18. A throttle verification system, comprising:
a throttle actuator as in claim 1; and
a module to receive a verification signal from the force sensor.

19. The system of claim 18 wherein the module includes an engine control unit.

20. The system of claim 19 further comprising:
a throttle position sensor;
wherein the verification signal and a throttle position sensor signal are evaluated by the module.

21. A throttle actuator comprising:
a base;
a carrier;
a circuit board coupled between the base and the carrier, said circuit board comprising first force sensor and a second force sensor;
a spring plate disposed between the carrier and the circuit board, said spring plate adjacent to and extending between the first force sensor and the second force sensor;
a cover coupled to the base enclosing the carrier, the spring plate and the circuit board between the cover and the base; and
a heater coupled between the cover and the base.

22. A throttle actuator comprising:
a base;
a carrier;
a circuit board coupled between the base and the carrier, said circuit board comprising first force sensor and a second force sensor;
a spring plate disposed between the carrier and the circuit board, said spring plate adjacent to and extending between the first force sensor and the second force sensor; and
a cover coupled to the base enclosing the carrier, the spring plate and the circuit board between the cover and the base;
wherein the carrier comprises a movement stop.

23. A throttle actuator, comprising:
a throttle hand control configured to be coupled to a grip bar, the throttle hand control including a throttle lever, the throttle lever including:
a base;
a carrier;
a circuit board coupled between the base and the carrier, said circuit board comprising first force sensor and a second force sensor;
a spring plate disposed between the carrier and the circuit board, said spring plate adjacent to and extending between the first force sensor and the second force sensor; and
a cover coupled to the base enclosing the carrier, the spring plate and the circuit board between the cover and the base.

* * * * *